Patented Oct. 9, 1934

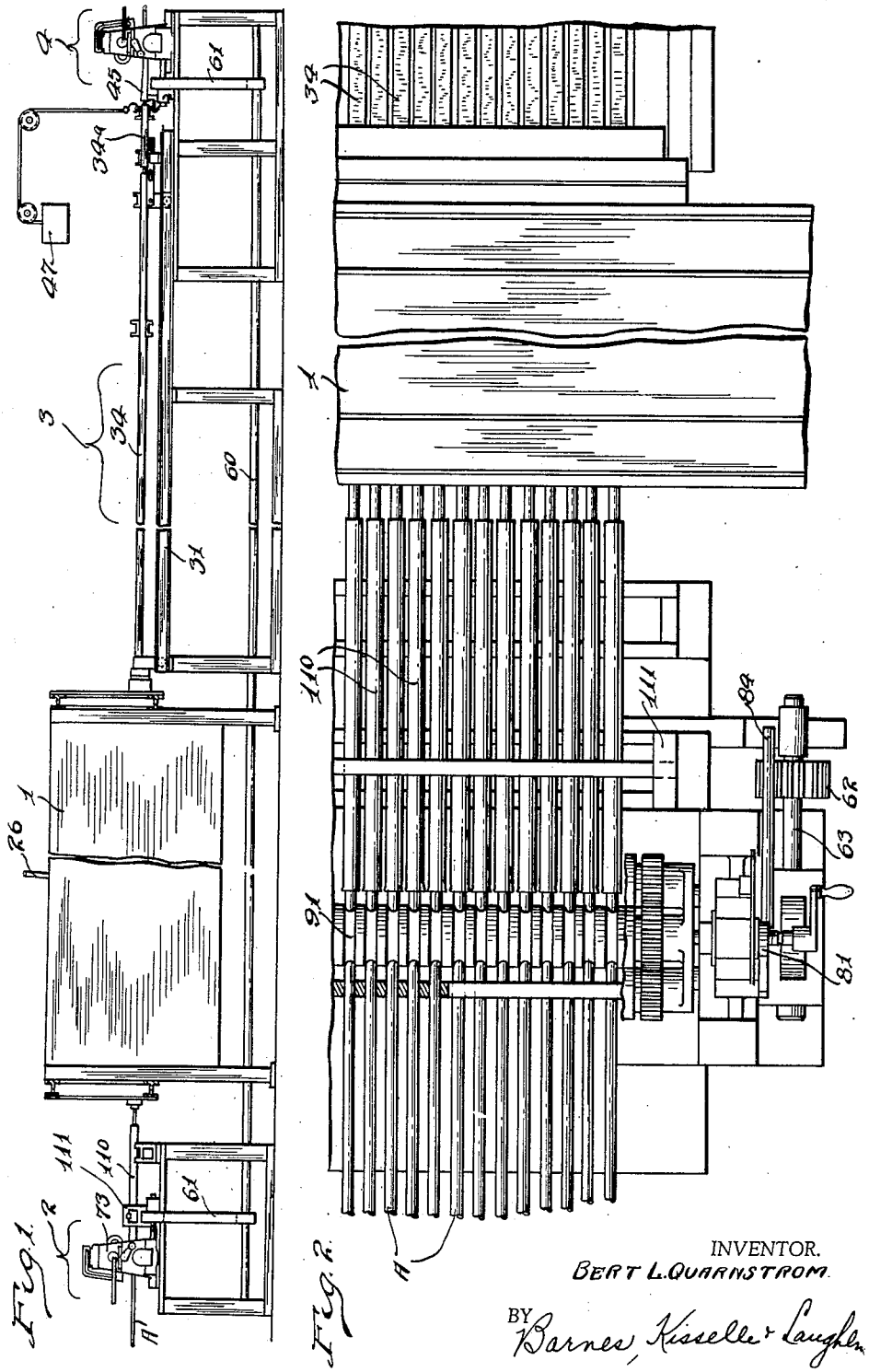

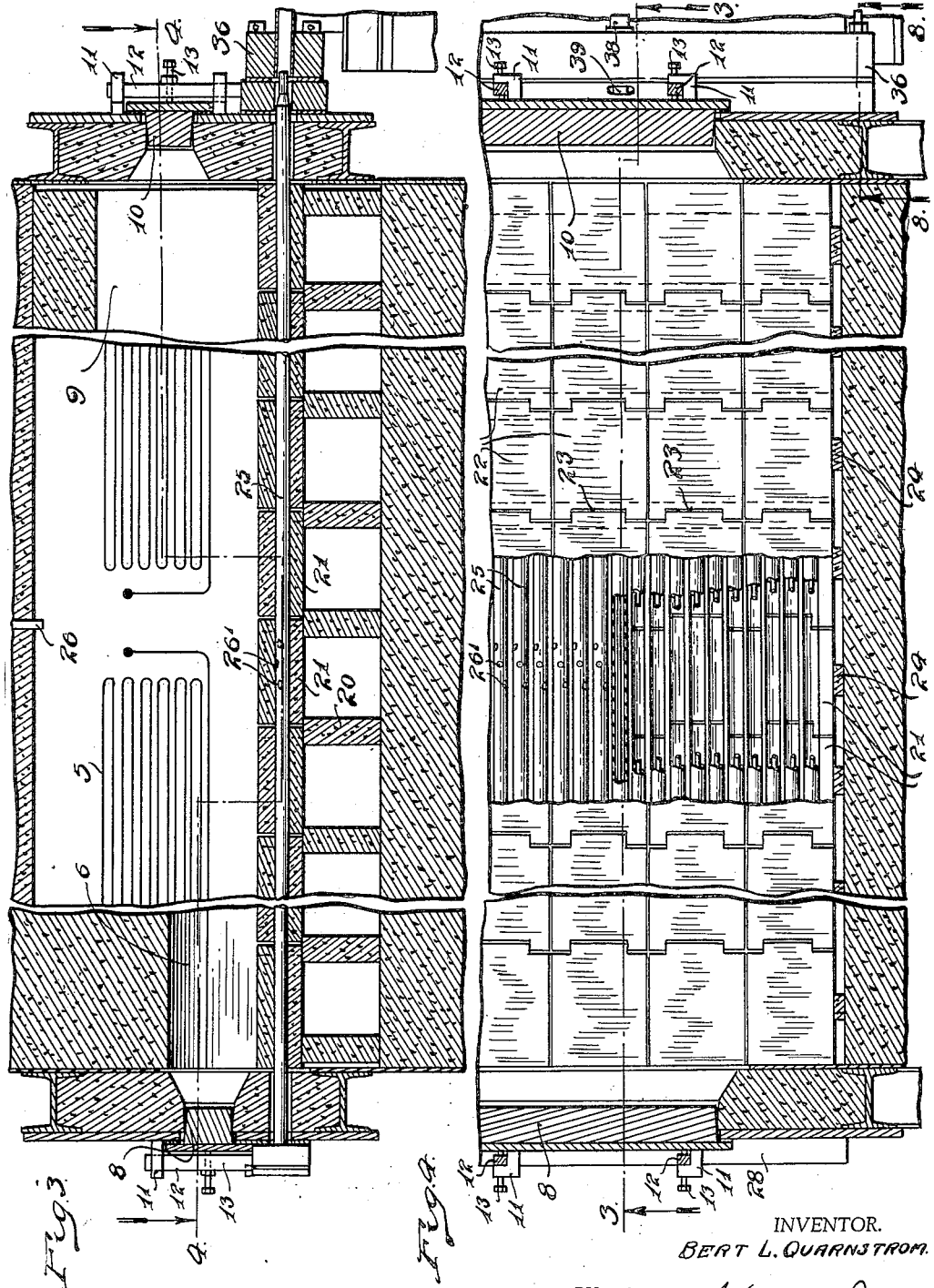

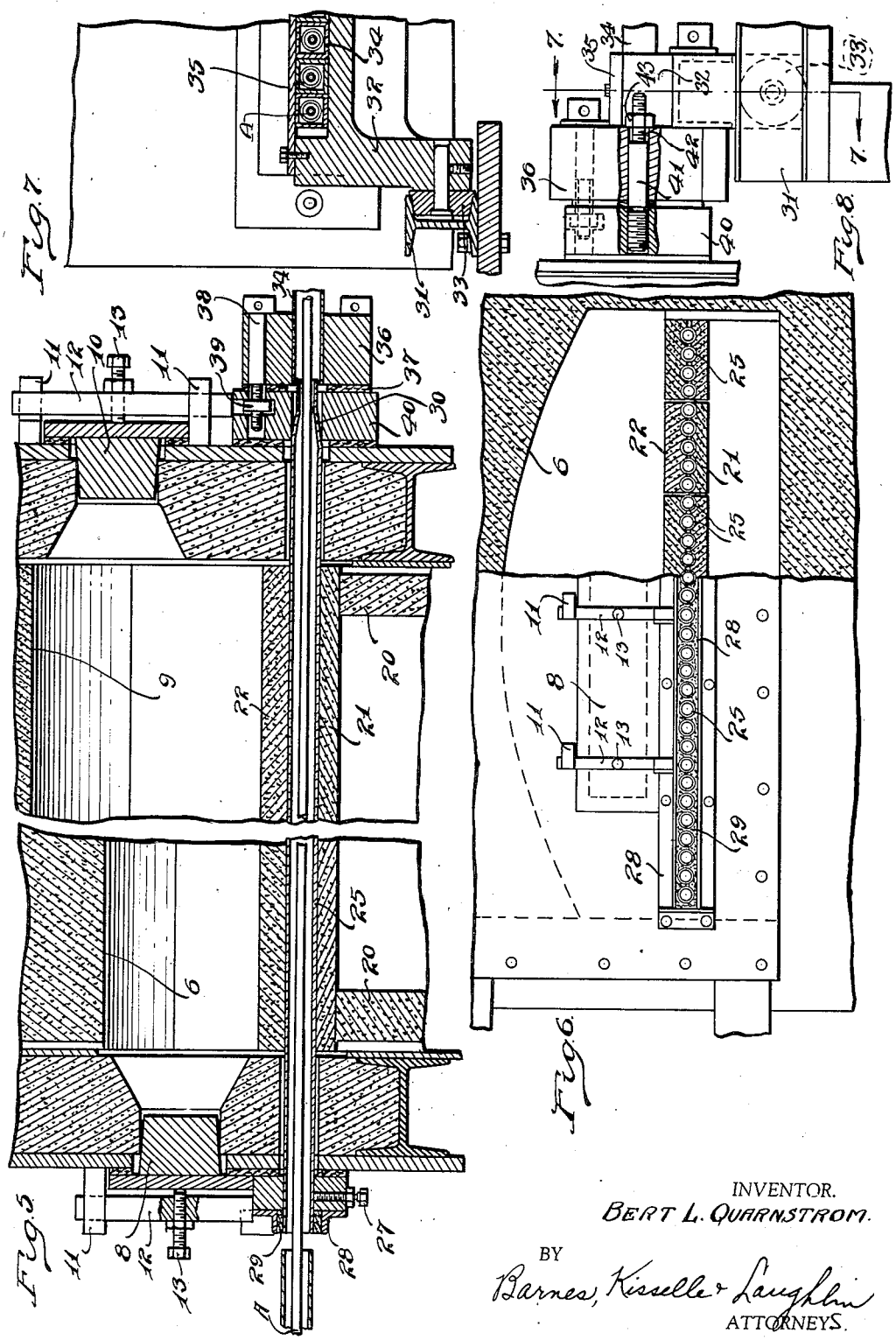

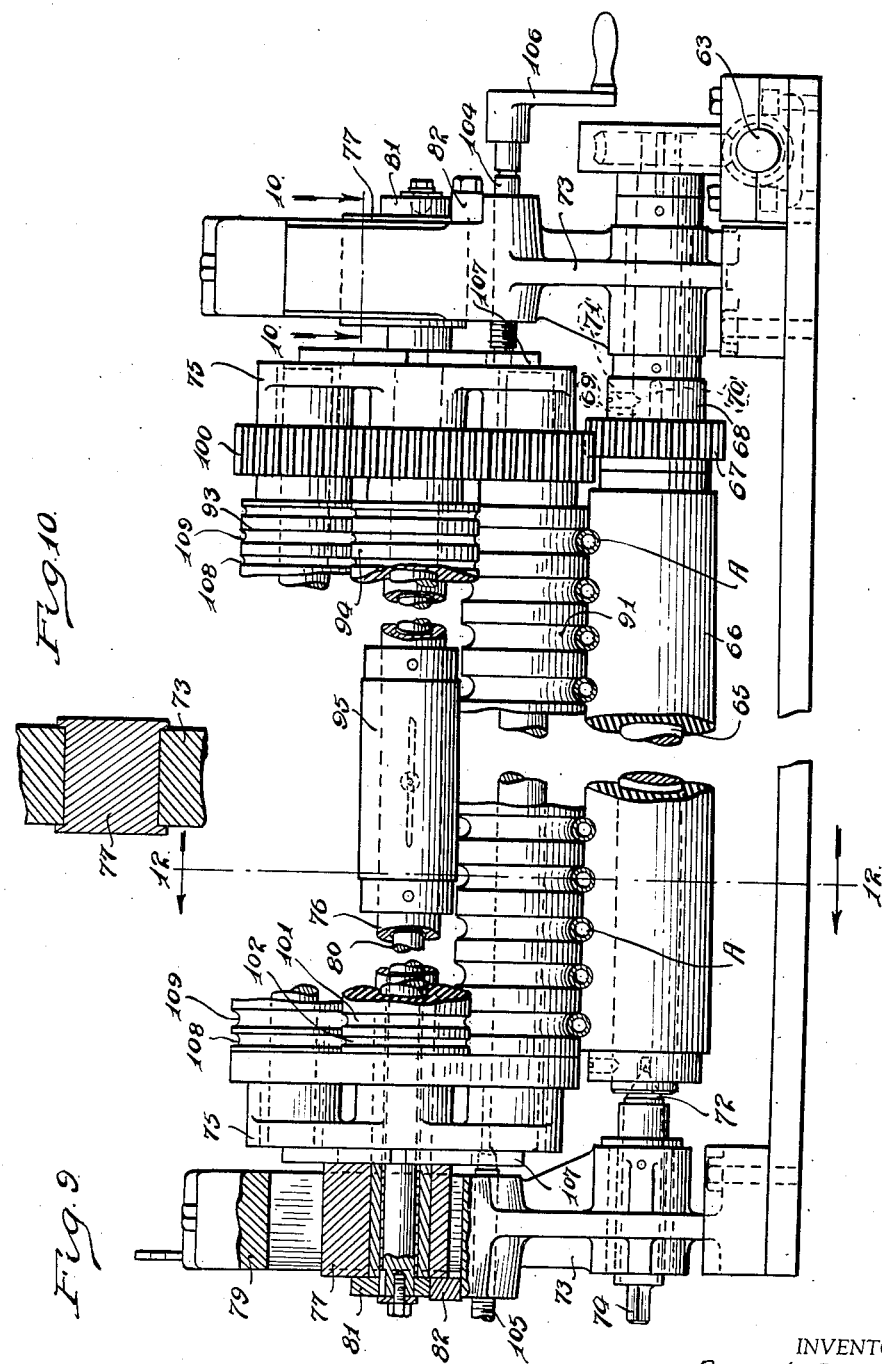

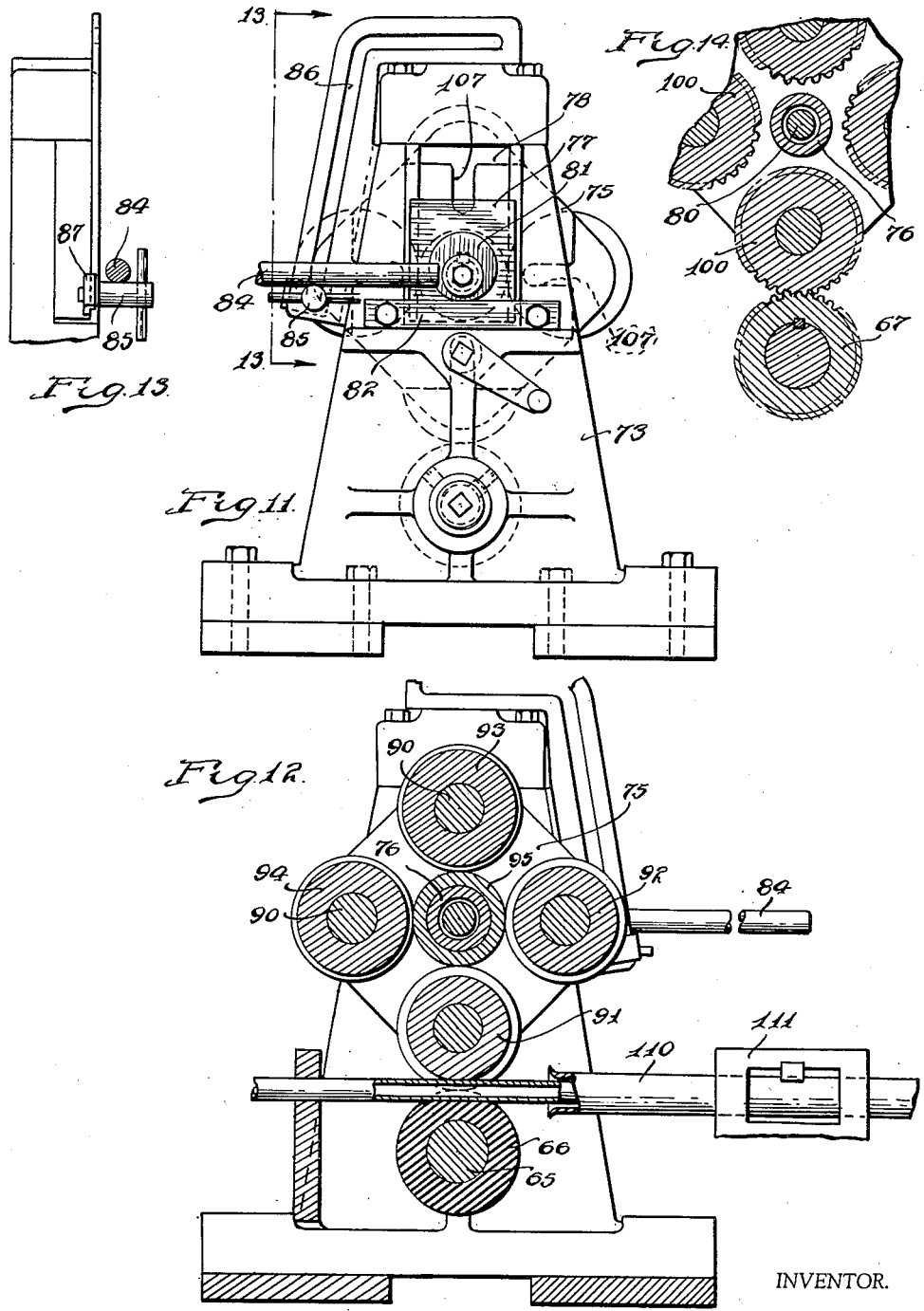

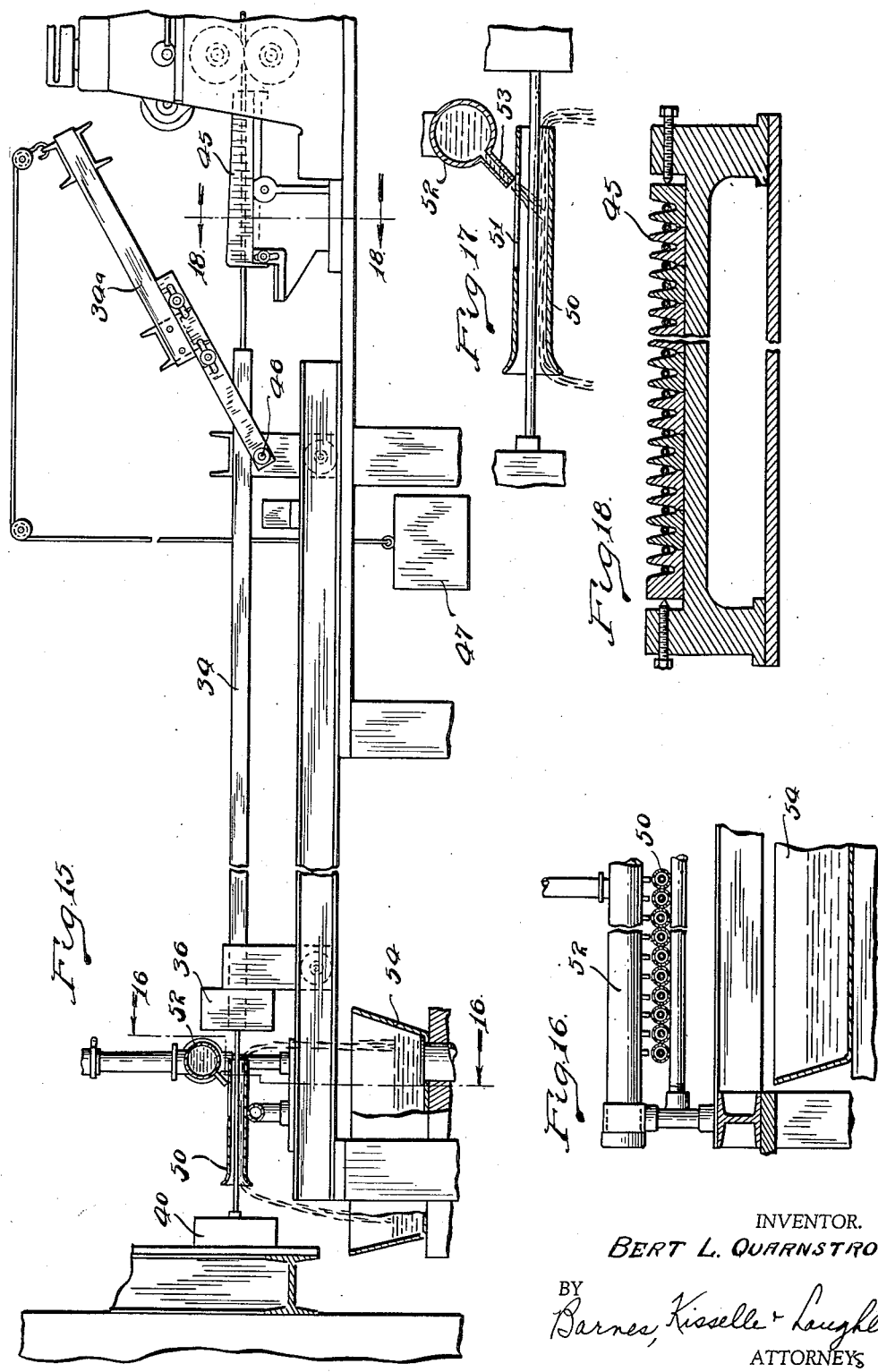

1,976,092

UNITED STATES PATENT OFFICE 1,976,092

APPARATUS FOR WELDING WITH COPPER

Bert L. Quarnstrom, Detroit, Mich., assignor to Bundy Tubing Company, Detroit, Mich., a corporation of Michigan Application May 25, 1932, Serial No. 613,570

17 Claims. (Cl. 263—3)

This invention relates to an apparatus for making articles which are welded or united by copper, or covered with a coating of copper, or both. The invention is concerned more particularly with an apparatus for making tubing of the type which is fashioned from a strip of stock and sealed, or having its parts joined by molten metal.

The invention is particularly advantageous for the making of tubing in which the tube body may be formed from ferrous metal, as for example, low carbon steel. A tube so fashioned may embody various tube structures; that is to say, it may be of so-called "Bundy" type of tube covered in United States Letters Patent, #1,431,368; or the tube may have a double ply wall formed of two separate pieces of stock, or of single ply wall with various kinds of seams, as for example, lap seam, lock seam, butt seam or the like. The sealing metal may be substantially pure copper or it may be an alloy involving copper.

The invention more particularly is concerned with the provision of a furnace structure through which the tubing may be passed, mechanism for feeding the tubes into the furnace, and a cooler device for receiving the tubes at the furnace outlet end together with mechanism for pulling tube lengths from the furnace. Practical conditions limit the size or length of the furnace, and the movement of a tube therethrough to be heated and acted upon is rather slow; accordingly, the invention contemplates the provision of a furnace and associated mechanism for handling a multiplicity of lengths of tube which may be simultaneously directed through the furnace. Other objects of the invention will become apparent as the detailed description progresses in connection with the accompanying drawings:

Fig. 1 is a side elevational view in illustration of a furnace and associated tube handling mechanism.

Fig. 2 is a plan view of a portion of the device illustrating principally the arrangement at the inlet end of the furnace.

Fig. 3 is a vertical section taken through the furnace structure with the view cut to reduce the overall length, the view looking substantially on line 3—3 of Fig. 4.

Fig. 4 is a horizontal section taken on line 4—4 of Fig. 3.

Fig. 5 is an enlarged vertical section illustrating in more detail the inlet and outlet end construction of the furnace.

Fig. 6 is an end view of the furnace illustrating the inlet end with part of the wall cut away to illustrate the interior.

Fig. 7 is an enlarged sectional view taken on line 7—7 of Fig. 8 showing a part of the cooler structure.

Fig. 8 is an enlarged sectional view taken substantially on line 8—8 of Fig. 4 showing a structure at the outlet end of the furnace.

Fig. 9 is a view of the mechanism of a unit utilized for moving a multiplicity of tubes, the view showing the mechanism in section and with parts cut away.

Fig. 10 is a sectional view taken on line 10—10 of Fig. 9.

Fig. 11 is an end elevation of the structure looking from the right hand end of Fig. 9.

Fig. 12 is a sectional view taken substantially on line 12—12 of Fig. 9.

Fig. 13 is a view illustrating a detail looking on line 13—13 of Fig. 11.

Fig. 14 is a fragmentary sectional view showing the driving gear arrangement.

Fig. 15 is a side elevational view with some parts in section illustrating a modified cooler arrangement.

Fig. 16 is a view looking substantially on line 16—16 of Fig. 15.

Fig. 17 is an enlarged detailed view of a portion of the cooler structure shown in Fig. 15.

Fig. 18 is an enlarged sectional view taken substantially on line 18—18 of Fig. 15.

By referring to Fig. 1, the apparatus is shown as comprising a furnace 1 into which a multiplicity of tubes are directed and fed by a unit generally referenced 2, and from which the tubes pass into a cooler unit generally referenced 3, and the tubes may be pulled through by a puller unit generally referenced 4 which in detail construction may be similar to the propelling unit 2.

Taking up first the furnace structure, reference may be made to Fig. 3. Here the interior of the furnace is shown as being provided with electrical heating elements 5. At the inlet end there may be an arch 6 provided with an opening for inspection purposes or the like which may be closed by a closure element 8. The outlet end may be provided with an arch 9, and an opening into it closed by a plug 10 similar to plug 8. Each closure plug may be clamped tightly into place by similar means. Such means are best shown in Fig. 5 and comprise hooks 11 mounted on the furnace; and as illustrated in Fig. 6, there may be several of them, into which bars 12 may be placed, and screws 13 may be tightened against the closure elements 8 and 10. The inlet end of the furnace is illustrated in Fig. 6 where the arch construction 6 is shown.

A multiplicity of tubes which are illustrated at A (Fig. 2) are to be passed into and through the furnace, and the interior of the furnace is designed for this purpose. By referring to Fig. 3 it will be noted that there are a number of post elements 20 on the floor of the furnace support. These posts support what may be termed the hearth. The posts may be of brick or other refractory material, as well also the hearth. The hearth structure may comprise elements 21 laid on the top of the posts 20, and which as shown in Fig. 6, are provided with grooves for the reception of pipes 25. The members 21 are lower hearth plates, while upper hearth plates 22 may be provided which are similar to plates 21 but are disposed in inverted position. These hearth plates 22 are likewise grooved so that the matched grooves of the plates substantially surround the pipes 25. Adjacent hearth plates, both upper and lower sets, may be arranged with tongue and groove interconnections, as illustrated at 23, to hold them more or less in proper assembled position. The hearth plate structure may be stabilized against the furnace wall by filler blocks 24. The posts 20 may be positively located as by means of being cemented to the furnace floor, whereas the hearth plates, both upper and lower, may be merely laid loosely in position.

The furnace is designed to utilize an inert or reducing atmosphere which may be hydrogen or which may be a gas termed "electrolene" obtained by a process of cracking ordinary illuminating gas. This gas may enter the furnace, as for example, through an inlet conduit 26. The pipes 25, as shown in Fig. 5, project through end walls of the furnace and may be located by set screws or the like 27. Attention is directed to the fact that each pipe may have some openings therein, as illustrated at 26′, of which there are three in the present instance located substantially midway of the length of the pipes. The several pipes may line up at the inlet end of the furnace much after the manner illustrated in Fig. 6, and a packing is preferably around them to aid in sealing the inlet end of the furnace against escape of the reducing gas. For this purpose, the several pipes may be surrounded by devices such as angle irons 28, and in the space surrounding the ends of the pipes and angle irons packing material 29 may be located. It is preferably designed so that there may be one pipe for each tube A which is passed through the furnace, although it is not necessary that the full capacity of the furnace be used at any given time. At the outlet end the pipes 25 may be slightly reduced in diameter as illustrated at 30.

A plurality of tubes may be passed through the furnace and the temperature in the furnace is sufficiently high to melt the copper, or the copper alloy, while the reducing atmosphere prevents oxidation. The copper becomes molten, coats the tube, and upon later solidifying copper-welds or brazes the tube seam, or copper-welds or brazes the plies together where the wall of the tube is more than one ply in thickness. The reducing gas enters the furnace through the inlet 26 preferably at a pressure slightly above atmospheric pressure. This reducing gas, it is found, will find its way in and around the hearth plates into the pipes 25 thus surrounding the tubes A. The reducing gas may escape through the pipes 25, and it is preferred that most of the gas escape from the outlet end. This is the reason for the packing 29. The pipes 25 are preferably of a material such as not to be attacked by the hydrogen or other reducing gas, and these pipes may be of chrome nickel or of refractory material. The reducing gas, it has been found, penetrates through the very metal of the pipes where they are of chrome nickel or of refractory material, and tube has been made where the pipes were not equipped with inlet apertures as at 26′; preferably, however, some inlet apertures are provided. The flow of the gas through the furnace may be metered or governed by its passage into the pipes.

Reference may be now made to the cooler, into which the tubes pass as they come out of the furnace, this cooler being generally identified by the character 3. It may comprise a suitable support having rails 31 (Figs. 1 and 5) with carrier elements 32 thereon supported on the rails by rollers 33. These carriers 32 support pipes 34 which are advantageously square in cross section, as illustrated in Fig. 7, and which may be clamped down by clamping irons 35. Due to the heat to which the cooler tubes are subjected they are made square so that they may abut against each other and thereby one tube supports another to minimize warping or bending under heat. There is a header bar 36 (Fig. 5) to which the ends of the tubes may be welded and through which they may extend, and this header bar may be moved against the outlet end of the furnace with an interposed gasket 37. It may be clamped to the furnace by cap screws 38 threaded into nuts 39 located in recesses in plate 40 on the end of the furnace. The cooler structure consisting of the tubes may be rolled upon the rails and properly positioned as regards the furnace, and in order to properly guide the header 36 into its appropriate position as regards the steel bar 40, the bar 40 may have guide pins 41 screw threaded therein and projecting outwardly therefrom for the reception into apertures 42 in the header plate 36 (see Fig. 8). These same guide pins may be utilized also to clamp bar 40 and header 36 together as by means of applying nuts 43 thereon. Pipes 25 may project slightly into pipes 34 and the guide pins prevent pipes 34 from striking the furnace pipes and dislodging them. Thus, as the tubes A pass out of the furnace they move directly into the cooler pipes 34, and the reducing gas also passes into the pipes 34 so that the tubes are maintained in the reducing gas while they are being cooled. The cooling action may be aided by running water upon portions of the pipes 34. As the tubes leave the cooler pipes 34 they pass into a guide device 45 (Figs. 1, 15 and 18) which may be ribbed plate, and which may be made up in sections as illustrated in Fig. 18, and this guide directs the tubes into the puller unit 4.

There may be times when it is desirable to temper or harden the tubes by chilling them as they come out of the furnace. The modified arrangement of the cooler illustrated in Fig. 15 is for such a purpose. The assembly of pipes 34 may be disengaged from the furnace and shifted upon its rollers to a position away from the furnace, as illustrated in Fig. 15. The outlet end of the cooler preferably has a shiftable unit comprising pipes 34a mounted upon arms pivoted as at 46. As shown in Fig. 1, the tubes 34a lie in close proximity to the guide device 45, but the unit may be swung upwardly out of the way as by means of a weight 47, as illustrated in Fig. 15, to permit the pipes 34 to be removed from the furnace. In the space between the furnace and pipes 34, another cooling or chilling device which may comprise short pipes 50, may be located and the tubes may pass therethrough. Each pipe 50 may be slotted, as at 51, and water may be passed thereinto by flowing from a main water pipe 52 having a series of small outlets 53 each discharging water into a pipe 50. The water flows from the pipes 50 into a suitable pan 54 or the like, from which it may be discharged. The tempering of the tubes may be governed by shifting the pipes 50 toward and away from the furnace, and as well, by shifting the water header 52 relative to the openings 51.

The description has now covered the furnace structure, the structure of the cooler unit, and there remains to be described the mechanism for moving the tubes lengthwise through the furnace and cooler. As above pointed out, such mechanism may comprise a unit at the inlet end of the furnace and at the outlet end of the cooler, and these units may be similar or identical. The machine may be equipped with a drive shaft 60 for driving the units 2 and 4 by chains 61, the chains operating over sprockets 62 (Fig. 2) on a shaft 63, and the ultimate drive being through a worm and worm gear, as illustrated in Fig. 9. The unit has a driven roller which may have a metal core 65 and a body of rubber or gum composition 66. A gear 67 may be keyed to the core 65 and the gear may have an extension 68 designed to slip over a driving shaft 69 to which it may be keyed as by means of a key 70 and with regards to which axial movement may be prevented by a set screw 71. The other end of the roller may be journaled by a center bearing 72 screw threaded in a support 73 and capable of being retracted by the application of a wrench or the like to its end 74. Inasmuch as the body 66 is of soft material, it may be desirable to replace the same from time to time, so this roller is preferably readily removable as follows: the set screw 71 may be loosened, the bearing 72 is retracted, and then the left end of the roller, as Fig. 9 is viewed, is moved out of alignment with the bearing 72, and then the roller may be pulled off the shaft 69.

There are two brackets 73 of similar formation, and the several rollers are disposed between these brackets. In order to accommodate tubes of different diameters, a plurality of different rollers are provided for cooperation with the roller 66. As shown in Fig. 12, there is a member which may be termed a plate 75, one near each bracket 73 (Fig. 9) and these are carried by a central axis tube 76. The ends of the tube 76 are carried in bearing blocks 77 which are vertically movable in the brackets 73 as the brackets are slotted for this purpose, as illustrated in Fig. 11 at 78. Passing axially through the tube 76 is a cam actuating shaft 80 having a cam 81 keyed to each end thereof, and these cams rest upon hardened steel supports 82. Possibly the term "eccentric" is more appropriate for the members 81. Each member 81, or at least one of them, may be provided with a handle 84 projecting therefrom which may be gripped by an operator and swung to rock the cams. It will be observed that the cams move in unison as they are tied together by the shaft 80. This serves to vertically shift the axis tube 76 and all parts carried thereby. The vertical position may be determined by means of a stop member 85 extending through a slot 86 and screw threaded into a nut 87 and against which the arm 84 may rest. It will be observed that the stop member 84 may be loosened and positioned wherever desired in the slot 86 to accordingly position the lever 84 which may rest thereon. This adjustment may be used for determining the working clearance between roller 66 and one of the grooved rollers, for getting the correct action for different size tube.

The plates 75 may carry a plurality of grooved rollers, and in the present instance the plates are substantially square and may carry a grooved roller near each corner. The rollers may be supported on shafts 90 and the rollers themselves are illustrated at 91, 92, 93 and 94. These rolls may be made up in sections sleeved over the shafts. For a purpose presently to be described, the central axis tube may be provided with a bushing or sleeve 95 disposed substantially centrally thereof and positioned as illustrated in Fig. 12 to frictionally engage the several rollers.

As illustrated in Fig. 9, the rollers may have grooves of different sizes for taking different sized tubes, and as shown, the tubes pass through the machine between one of the grooved rollers and the roller 66 with the roller 66 distorting for the purpose. As shown in Fig. 9, the roller 91 has relatively large grooves, the roller 93 has smaller grooves, and the roller 94 has smaller grooves. Obviously, the roller 92 may have grooves of still another size. The plates 75 and the several rolls assembled thereon constitute a rotary unit which may be shifted by rotary action to bring any one of the grooved rollers in cooperative relation with the rubber roll. To do this, an operator grasps a lever 84 and shifts the same to the end that the cams elevate the axis shaft 76 and everything carried thereby. It will be noted that each of the grooved rollers has a gear 100, and the gear on the roller which is functioning with the rubber roller works with the gear 67. When the unit is elevated the gear teeth become free of each other, and then the grooved roller assembly may be turned on the axis 76 to position any one of the rollers lowermost, whereupon the assembly may be lowered into operative position and the gear on the lowermost roller then has its teeth meshed with the teeth on the gear 67.

The spacing of the tubes which are acted upon is predetermined by the spacing of the pipes in the furnace. Accordingly, with small tube one or more of the rollers may be provided with two sets of grooves. The roller 94 has a set of grooves 101 which, as shown, are lined up with the proper position for the tubes to be acted upon, and another set of grooves 102 axially removed therefrom. The spacing from center to center of grooves 101 is the same as the center to center spacing of the furnace pipes, and the spacing from center to center of grooves of 102 is the same as the spacing from center to center of the furnace pipes. However, it is necessary to shift the roller axially to properly position the grooves 102. The axial position of the grooved roller assembly may be determined by a pair of screw threaded elements 104 and 105 which are threaded in the brackets, and which may be rotated by means of a suitable wrench or handle 106. These screw threaded elements have end portions which take into slots 107 in the plates. By advancing one screw threaded element and retracting the other the grooved roller assembly may be shifted axially into proper position. When the grooved roller assembly is adjusted rotatably it must either be elevated high enough to have grooves 107 clear the elements 104 and 105, else the elements 104 and 105 must be retracted. Roller 93 also has two sets of grooves as shown at 108 and 109.

The purpose for the bushing 95 will become apparent as Fig. 12 is considered. It will be appreciated that the length of the grooved rollers may be considerable, depending upon the number of tubes, and that the rubber roller creates a considerable pressure upwardly onto the functioning grooved roller and its shaft. To reinforce the same, the bushing 95 reacts against the uppermost roller 90. Also, it will be noted that guide tubes 110 may be used, the same may be supported by a suitable bracket or the like 111 for guiding the tubes from the driving unit to a point in close proximity to the inlet end of the furnace (see Fig. 1).

In operating the apparatus a plurality of tubes may have their forward ends properly positioned, and the driving rollers may be adjusted as regards the tubes. The tubes are then advanced into the furnace and their forward ends ultimately pass through the furnace, the cooler tubes and into the roller unit 4. The distance between the units 2 and 4 is preferably less than the length of the tubes. When the tubes pass into the unit 4 and are being propelled thereby, the unit 2 may be placed out of commission so as to not act upon the tubes, and this may be done by merely elevating the grooved roller assembly. The speed of movement of the tubes may be varied, and assuming that the furnace conditions are constant, the speed of movement of the tubes may be varied in accordance with the total weight of metal represented by tubes passing through the furnace. In other words, the smaller tubes may move faster, or tubes with a thin wall may move faster than tubes of the same size with a thicker wall. In any event the copper or copper alloy becomes molten, and upon solidifying forms a coat on the tube inside, or outside, or both. One manner of proceeding is to make the tubing of strip stock which is copper plated in its flat form so that this copper melts in the furnace. The plating may be done by electro-deposition, or by other processes. Also, an additional quantity of copper may be supplied, if necessary, by running in copper strips or copper wire with the tube. The word "copper" is used in a broad sense and is to cover pure copper or an alloy thereof.

The pipes 34 may merely be cooled by contact with the atmosphere, or for that matter, they may be cooled by the application of a cooling fluid such as water. The pipes 34 may be of such length as to effect relatively slow cooling of the tube with the result that a tube made of low carbon steel comes out in a rather soft pliable condition. The reducing gas which may escape from the outlet ends of the cooler pipes may be observed by a burning flame; some may also escape at the inlet end.

If a tempered tube is desired, an arrangement such as shown in Fig. 15 may be employed wherein the tubes are chilled quickly upon coming out of the furnace. Due to the arch construction in the furnace the tubes may cool somewhat as they pass through the arch at the outlet end of the tube and through the furnace wall so that the copper may be solidified as the tubes come out of the furnace, and so that the copper is solidified before being subjected to the chilling water bath. The chilling process, as shown in Fig. 15, may result in some oxidation but a stiff, relatively brittle tube may be had. These tubes may be pickled later to remove the oxide.

The reducing gas may be passed into the furnace preferably at a pressure only slightly higher than atmospheric pressure and the escape of this gas may take place only through the pipes and inlet and outlet ends; preferably, substantially the only escape for the reducing gas is through the pipes. The amount of gas escaping is preferably such as to represent a continuous flow of gas through the pipes and furnace, and this may be determined by the rapidity with which the gas obtains access to the interior of the pipes. With the chrome nickel pipes a few apertures near their center, as illustrated at 26', has been found to suffice. Even without these apertures the gas penetrates through the very wall of the chrome nickel walls and escapes. With refractory pipes having a greater porosity than the metal it is believed that sufficient gas would pass therethrough so that apertures need not be used. In short, the general flow of the hydrogen gas or other reducing gas with a substantially given pressure may be metered in the above manner.

The tubing is moved through the furnace pipes, and for at least a portion of the time the copper or other sealing metal for sealing and coating the tube is in a molten condition. There may be a tendency for some of the molten copper to be rubbed off the tube by frictional contact with the inside wall of the pipes. Copper and steel have considerable affinity for each other and it is thought to be preferred therefore that the pipes be of a material which has a lesser degree of affinity for copper than steel to minimize the tendency of the copper to deposit upon and penetrate into the pipes. Chrome nickel is a material of this type and is advantageous; also, refractory material may be employed as it likewise has no particular affinity for copper.

I claim:

1. A furnace structure for tube making comprising furnace walls, opposite walls having inlet and outlet openings, a multiplicity of pipes extending through the furnace having their ends disposed in the said openings for the passage therethrough of tubes, and a hearth comprising hearth elements provided with grooves into which the pipes fit.

2. A furnace structure for tube making comprising furnace walls, opposite walls having inlet and outlet openings, a multiplicity of pipes extending through the furnace having their ends disposed in the said openings for the passage therethrough of tubes, a hearth comprising hearth elements provided with grooves into which the pipes fit, and other hearth elements provided with grooves and disposed in inverted relation and fitting over the pipes.

3. A furnace structure for treating an iron or steel article of indefinite length such as a tube with molten copper to weld or copper coat the same, comprising a furnace having a chamber adapted to be heated to a temperature above the melting point of the copper, a pipe extending through the chamber from one wall thereof to the opposite wall thereof, said pipe being of a material which has an affinity for copper which is less than the affinity for copper of the iron or steel of the article, and means for moving such an article lengthwise through the pipe, together with a quantity of copper whereby the copper is melted and the molten copper is caused to adhere or diffuse with the iron or steel of the article due to the greater affinity of the iron or steel of the article than the material of the pipe for copper so that loss of copper in the pipe is minimized.

4. A furnace structure for treating an iron or steel article of indefinite length such as a tube with molten copper to weld or copper coat the same, comprising a furnace having a chamber adapted to be heated to a temperature above the melting point of the copper, a pipe extending through the chamber from one wall thereof to the opposite wall thereof, said pipe being composed of chrome nickel which has an affinity for copper which is less than the affinity for copper of the iron or steel of the article, and means for moving such an article lengthwise through the pipe together with a quantity of copper, whereby the copper is melted and the molten copper is caused to adhere or diffuse with the iron or steel of the article due to the greater affinity of the iron or steel of the tube for copper than the chrome nickel pipe whereby loss of copper in the pipe is minimized.

5. A furnace structure for treating an iron or steel article of indefinite length such as a tube with molten copper to weld or copper coat the same, comprising a furnace having a chamber adapted to be heated to a temperature above the melting point of the copper, a pipe extending through the chamber from one wall thereof to the opposite wall thereof, said pipe being composed of refractory material which has an affinity for copper which is less than the affinity for copper of the iron or steel of the article, and means for moving such an article lengthwise through the pipe together with a quantity of copper, whereby the copper is melted and the molten copper is caused to adhere or diffuse with the iron or steel of the article due to the greater affinity of the iron or steel of the tube for copper than the refractory pipe whereby loss of copper in the pipe is minimized.

6. A furnace structure for tube making comprising furnace walls, opposite walls having inlet and outlet openings, a multiplicity of pipes extending through the furnace having their ends disposed in the said openings for the passage therethrough of tubes, a hearth comprising hearth elements provided with grooves into which the pipes fit, other hearth elements provided with grooves and disposed in inverted relation and fitting over the pipes, and packing means surrounding all of the tubes at the inlet end of the furnace.

7. An apparatus for tube making comprising a furnace, adapted to have tubes passed lengthwise therethrough, a cooler for receiving the tubes at the outlet end of the furnace, said cooler comprising pipes substantially square in cross-section and disposed in abutting relation and each adapted to receive one tube.

8. An apparatus for tube making comprising a furnace, means for passing tube lengthwise into the furnace, a cooler at the outlet end of the furnace for receiving the tube as it comes out of the furnace, a support for the cooler, another cooler structure, said first cooler being shiftable on said support relative to the furnace so that said other cooler structure may be interposed between the furnace and the first mentioned cooler.

9. An apparatus for making tube comprising a furnace, means for passing tube lengthwise into the furnace, a cooler into which the tube passes as it comes out of the furnace, means supporting the cooler, said cooler being shiftable on the supporting means, means for engaging the tube as it comes out of the cooler for drawing the same through the furnace, said cooler fitting between the furnace and drawing means, and a movable section of the cooler adapted to be shifted out of position so that said cooler may be shifted on the support between the furnace and the said tube drawing means.

10. An apparatus for making tube comprising a furnace, tube engaging means for pulling tube through the furnace, a cooler structure between the furnace and the engaging means and fitting relatively snugly therebetween, and a section of the cooler which is shiftable out of position to shorten the overall length thereof so that the cooler may be moved away from the furnace.

11. An apparatus for making tube comprising a furnace, tube engaging means for pulling tube through the furnace, a cooler structure between the furnace and the tube engaging means and fitting relatively snugly therebetween, there being a section of the cooler which is shiftable out of position to shorten the overall length thereof so that the cooler may be moved away from the furnace, and another cooler adapted to be placed between the furnace and the first mentioned cooler when it is so shifted.

12. An apparatus for making tube comprising a furnace, tube engaging means for pulling tube through the furnace, a cooler structure between the furnace and the tube engaging means and fitting relatively snugly therebetween, there being a section of the cooler which is shiftable out of position to shorten the overall length thereof so that the cooler may be moved away from the furnace, and another cooler adapted to be placed between the furnace and the first mentioned cooler when it is so shifted, said other cooler comprising pipes through which the tube passes, and means for flowing water to the pipes.

13. In a furnace for making copper or copper alloy coated tubing, one or more pipes extending through the furnace from inlet end to outlet end through which the tubing is adapted to be drawn for subjecting the tube to heat for melting the copper or copper alloy, said pipe or pipes being made of a material having an affinity for the copper or copper alloy less than the affinity of the copper or copper alloy for the basic material of the tube.

14. In a furnace for making copper or copper alloy coated tubing, one or more pipes extending through the furnace from inlet end to outlet end through which the tubing is adapted to be drawn for subjecting the tube to heat for melting the copper or copper alloy, said pipe or pipes being made of a material having an affinity for the copper or copper alloy less than the affinity of the copper or copper alloy for the basic material of the tube, means for supplying a reducing gas to the furnace, and the material of said pipe or pipes being such as to resist attack by the reducing gas.

15. The method of handling reducing gas in a furnace for making tube or the like, wherein the tube passes through pipes which extend through the furnace, comprising the steps of introducing the gas into the chamber of the furnace outside of the pipes under pressure in excess of atmospheric pressure, causing the gas to flow into the pipes containing the tube with the gas escaping from the ends of the pipes and governing the flow of the gas from the chamber into the pipes to control the rate of flow of gas through the furnace chamber and pipes.

16. A furnace structure for making tubing or the like welded with copper, comprising a furnace having a chamber therein, a plurality of pipes extending through the chamber and substantially sealed by the walls of the chamber, said pipes being adapted to have each a tube passed therethrough, means for introducing a reducing gas into the furnace chamber, the said pipes having walls for the passage therethrough of the reducing gas, whereby the gas may enter and flow through the pipes while surrounding the tubes with the gas escaping at the opposite ends of the pipes.

17. A furnace structure for making tubing or the like welded with copper, comprising a furnace having a chamber therein, a plurality of pipes extending through the chamber and substantially sealed by the walls of the chamber, said pipes being adapted to have each a tube passed therethrough, means for introducing a reducing gas into the furnace chamber, each of said pipes having one or more apertures through its wall located substantially centrally of the furnace chamber, said apertures being for the passage of reducing gas therethrough into the pipes whereby the reducing gas surrounds the tubes and may escape from the opposite ends of the pipes.

BERT L. QUARNSTROM.